(12) United States Patent
Otsuka et al.

(10) Patent No.: US 11,305,433 B2
(45) Date of Patent: Apr. 19, 2022

(54) ROBOT, ROBOT CONTROL METHOD, AND STORAGE MEDIUM

(71) Applicant: CASIO COMPUTER CO., LTD., Tokyo (JP)

(72) Inventors: Toshihiko Otsuka, Ome (JP); Hisao Kumai, Tokorozawa (JP); Takahiro Tomida, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 496 days.

(21) Appl. No.: 16/447,719

(22) Filed: Jun. 20, 2019

(65) Prior Publication Data

US 2019/0389072 A1 Dec. 26, 2019

(30) Foreign Application Priority Data

Jun. 21, 2018 (JP) .............................. JP2018-117796

(51) Int. Cl.
| | |
|---|---|
| *G06F 17/00* | (2019.01) |
| *B25J 11/00* | (2006.01) |
| *G06K 9/00* | (2022.01) |
| *B25J 9/16* | (2006.01) |
| *B25J 19/02* | (2006.01) |
| *B25J 19/04* | (2006.01) |
| *B25J 13/00* | (2006.01) |

(52) U.S. Cl.
CPC .............. *B25J 11/001* (2013.01); *B25J 9/163* (2013.01); *B25J 11/0015* (2013.01); *B25J 13/003* (2013.01); *B25J 19/023* (2013.01); *B25J 19/026* (2013.01); *B25J 19/04* (2013.01); *G06K 9/00288* (2013.01)

(58) Field of Classification Search
CPC ...... B25J 11/001; B25J 9/163; B25J 11/0015; B25J 13/003; B25J 19/023; B25J 19/026; B25J 19/04; B25J 9/1694; B25J 11/0005; B25J 9/1602; B25J 11/00; G06K 9/00288; G05B 2219/40264
USPC .......................................................... 700/246
See application file for complete search history.

(56) References Cited

U.S. PATENT DOCUMENTS

| | | | | |
|---|---|---|---|---|
| 7,827,124 | B2 * | 11/2010 | McKinstry ............. | G05B 13/04 706/14 |
| 8,562,488 | B2 * | 10/2013 | Alberts ................ | A61H 1/0214 482/4 |
| 8,706,241 | B2 * | 4/2014 | Firlik ..................... | G16H 20/70 607/48 |
| 8,876,663 | B2 * | 11/2014 | Alberts .............. | A63B 24/0087 482/4 |

(Continued)

FOREIGN PATENT DOCUMENTS

| | | | | |
|---|---|---|---|---|
| EP | 3501761 | A1 * | 6/2019 | ............. B25J 13/08 |
| JP | 2006320621 | A | 11/2006 | |

*Primary Examiner* — Ronnie M Mancho
(74) *Attorney, Agent, or Firm* — Holtz, Holtz & Volek PC

(57) ABSTRACT

In a robot, an actuator causes the robot to operate. A processor is configured to acquire, when a holding portion is held by a predetermined target, physical information on a physical function of the predetermined target, and cause, by controlling the actuator depending on the acquired physical information, the robot to perform at least one of an examination operation for examining the physical function of the predetermined target and a training support operation for training the physical function of the predetermined target.

20 Claims, 13 Drawing Sheets

(56) References Cited

U.S. PATENT DOCUMENTS

| | | | | |
|---|---|---|---|---|
| 9,080,918 B2* | 7/2015 | Fishel | | G01L 5/228 |
| 9,390,630 B2* | 7/2016 | Daniels | | G09B 5/065 |
| 9,717,440 B2* | 8/2017 | Abdelghani | | A61F 2/72 |
| 10,071,015 B2* | 9/2018 | Seo | | A61H 23/0218 |
| 10,350,760 B2* | 7/2019 | Tomida | | B25J 9/0003 |
| 10,546,185 B2* | 1/2020 | Sasaki | | G06F 21/6245 |
| 10,614,203 B2* | 4/2020 | Onodera | | G10L 17/02 |
| 10,960,225 B2* | 3/2021 | Adaikkan | | A61N 5/1001 |
| 2006/0241718 A1* | 10/2006 | Tyler | | A61B 5/11 |
| | | | | 607/45 |
| 2009/0221928 A1* | 9/2009 | Einav | | A61B 5/4076 |
| | | | | 600/544 |
| 2009/0318779 A1* | 12/2009 | Tran | | A61B 5/026 |
| | | | | 600/301 |
| 2010/0106743 A1* | 4/2010 | Brunner | | G16H 10/60 |
| | | | | 707/780 |
| 2010/0268287 A1* | 10/2010 | Celnik | | A61N 1/36025 |
| | | | | 607/2 |
| 2011/0004126 A1* | 1/2011 | Einav | | G16H 20/30 |
| | | | | 600/595 |
| 2015/0187368 A1* | 7/2015 | Kita | | G10L 13/00 |
| | | | | 386/285 |
| 2017/0154207 A1* | 6/2017 | Sasaki | | G06K 9/4652 |
| 2017/0169203 A1* | 6/2017 | Onodera | | G10L 17/06 |
| 2017/0278414 A1* | 9/2017 | Kadosawa | | G09B 7/00 |
| 2018/0082334 A1* | 3/2018 | Shimoda | | G06Q 30/0261 |
| 2018/0088057 A1* | 3/2018 | Hashikami | | B25J 9/1674 |
| 2018/0093092 A1* | 4/2018 | Howard | | G01N 21/1702 |
| 2018/0165980 A1* | 6/2018 | Kadosawa | | G09B 7/02 |
| 2018/0286432 A1* | 10/2018 | Shimada | | G10L 15/24 |
| 2018/0289318 A1* | 10/2018 | Howard | | A61N 5/0622 |
| 2018/0370032 A1* | 12/2018 | Ichikawa | | G06K 9/00664 |
| 2018/0370039 A1* | 12/2018 | Nakagome | | A63H 11/00 |
| 2018/0376069 A1* | 12/2018 | Makino | | H04N 5/232 |
| 2019/0176331 A1* | 6/2019 | Ogawa | | B25J 11/0005 |
| 2019/0176336 A1* | 6/2019 | Takagi | | B25J 9/1656 |

* cited by examiner

FIG. 4

MOTION DB

| CONDITION | MOTION |
|---|---|
| RECOGNIZE PERSON | MOVE TOWARD PERSON EXPRESSING INTEREST |
| HEAR MUSIC | MOVE AROUND HAPPILY |
| HEAR CONVERSATION | CHANGE EXPRESSION AND WANDER |
| HEAR BIG NOISE | GET STARTLED AND LOOK AROUND |
| GET STROKED | MAKE HAPPY EXPRESSION |
| HIGH TEMPERATURE | LOOK FOR AND MOVE TO COOLER PLACE EXPRESSING FEELING HOT |
| LOW TEMPERATURE | LOOK FOR AND MOVE TO WARMER PLACE EXPRESSING FEELING COLD |
| TIME TO GO TO BED | MOVE TO CHARGING STATION EXPRESSING FEELING SLEEPY |
| ... | ... |

USER DB

192

| USER ID | FACIAL IMAGE DATA | EXAMINATION HISTORY | | TRAINING HISTORY | |
|---|---|---|---|---|---|
| | | DATE/ TIME | EXAMINATION RESULT | DATE/ TIME | TRAINING DETAILS |
| 001 | DATA A | 9/1 | NORMAL | 8/31 | ... |
| 002 | DATA B | 9/4 | DETERIORATED | 9/2 | ... |
| 003 | DATA C | 8/20 | NORMAL | 8/25 | ... |
| 004 | DATA D | 8/22 | DETERIORATED | 8/21 | ... |
| ⋮ | | | ⋮ | | |

HOLD MY HANDS TIGHTLY

GRIP STRENGTH DB

UNIT: kg

| DATE/TIME | GRIP STRENGTH VALUE (RIGHT) | GRIP STRENGTH VALUE (LEFT) | GRIP STRENGTH VALUE (AVERAGE OF RIGHT AND LEFT) |
|---|---|---|---|
| 20XX/9/1 | 44 | 40 | 42 |
| 20XX/9/2 | 40 | 35 | 37.5 |
| 20XX/9/3 | 38 | 35 | 36.5 |
| 20XX/9/4 | 25 | 22 | 23.5 |
| ⋮ | ⋮ | ⋮ | ⋮ |

ROBOT, ROBOT CONTROL METHOD, AND STORAGE MEDIUM

CROSS-REFERENCE TO RELATED APPLICATIONS

This application claims priority to Japanese Patent Application No. 2018-117796 filed on Jun. 21, 2018, the content of which is incorporated herein in its entirety.

BACKGROUND

1. Technical Field

The present invention relates to a robot, a robot control method, and a storage medium.

2. Related Art

There is known a technique for acquiring physical information on a physical function of a predetermined target to care for the physical function. For example, JP 2006-320621 A discloses a stress care apparatus that acquires the grip strength of a predetermined target as physical information, determines the tension or fatigue of the predetermined target based on the acquired grip strength, and generates a stimulus that relieves the tension or fatigue of the predetermined target when the predetermined target is feeling stress or the like.

SUMMARY

One aspect of a robot according to the present invention includes:
 an actuator configured to cause the robot to operate;
 a holding portion configured to be held by a target; and
 a processor configured to:
 acquire, when the holding portion is held by the target, physical information on a physical function of the target, and
 cause, by controlling the actuator depending on the acquired physical information, the robot to perform at least one of an examination operation for examining the physical function of the target and a training support operation for training the physical function of the target.

One aspect of a robot control method according to the present invention includes:
 acquiring, when a holding portion of the robot is held by a target, physical information on a physical function of the target; and
 causing, depending on the acquired physical information, the robot to perform at least one of an examination operation for examining the physical function of the target and a training support operation for training the physical function of the target.

One aspect of a storage medium according to the present invention that stores a program for causing a computer of a robot to function as:
 an acquisition unit that acquires, when a holding portion of the robot is held by a target, physical information on a physical function of the target; and
 a motion control unit that causes, depending on the physical information acquired by the acquisition unit, the robot to perform at least one of an examination operation for examining the physical function of the target and a training support operation for training the physical function of the target.

BRIEF DESCRIPTION OF THE DRAWINGS

FIG. 4 is a table showing, as an example, motion information stored in a motion DB of the robot according to the first embodiment;

FIG. 5 is a table showing, as an example, user information stored in a user DB of the robot according to the first embodiment;

DETAILED DESCRIPTION

Figure 1:
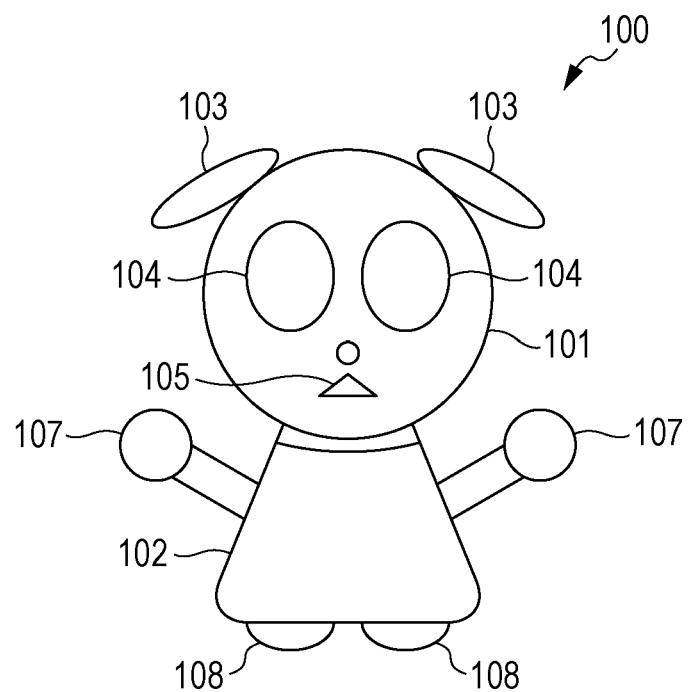
FIG. 1 is a view showing an appearance of a robot according to a first embodiment of the present invention.

Embodiments of the present invention are described below with reference to the drawings. In the drawings, the same or equivalent elements are denoted by the same reference signs.

First Embodiment

FIG. 1 shows an appearance of a robot 100 according to a first embodiment of the present invention. The robot 100 is an apparatus that has a shape imitating an animal (pet) and operates autonomously in accordance with a predetermined operation program.

The robot 100 operates variously in response to external stimuli, such as a call and a touch from a predetermined target outside the robot 100. This enables the robot 100 to communicate and interact with the predetermined target.

The predetermined target is a target outside the robot 100 with whom the robot 100 communicates and interacts. The predetermined target can be, specifically, a user who is a person around the robot 100 (the owner of the robot 100, a family member, a friend, or the like), an animal around the user (a pet or the like kept by the user), another robot other than the robot 100, or the like. It can be said that the predetermined target is a communication target, a communication partner, an interacting target, an interacting partner, or the like. In the following, an example in which the predetermined target is a user is described.

As shown in FIG. 1, the robot 100 has a three-dimensional shape imitating a dog in appearance. The robot 100 is made of, for example, a hard synthetic resin, such as plastic, as a main material. The robot 100 includes a head portion 101, a body portion 102, an ear portion 103, an eye portion 104, a mouth portion 105, a hand portion 107, and a foot portion 108.

The head portion 101, the ear portion 103, the hand portion 107, and the foot portion 108 can be moved by a drive member incorporated in the robot 100. The head portion 101 is attached to the body portion 102 so as to be rotatable in three directions of pitch, roll, and yaw with a neck joint provided on the neck. The eye portion 104 includes a display unit 117 that displays an image related to the eye (eyeball or the like). The mouth portion 105 includes an imaging unit 115a that images the front of the robot 100.

Figure 2:
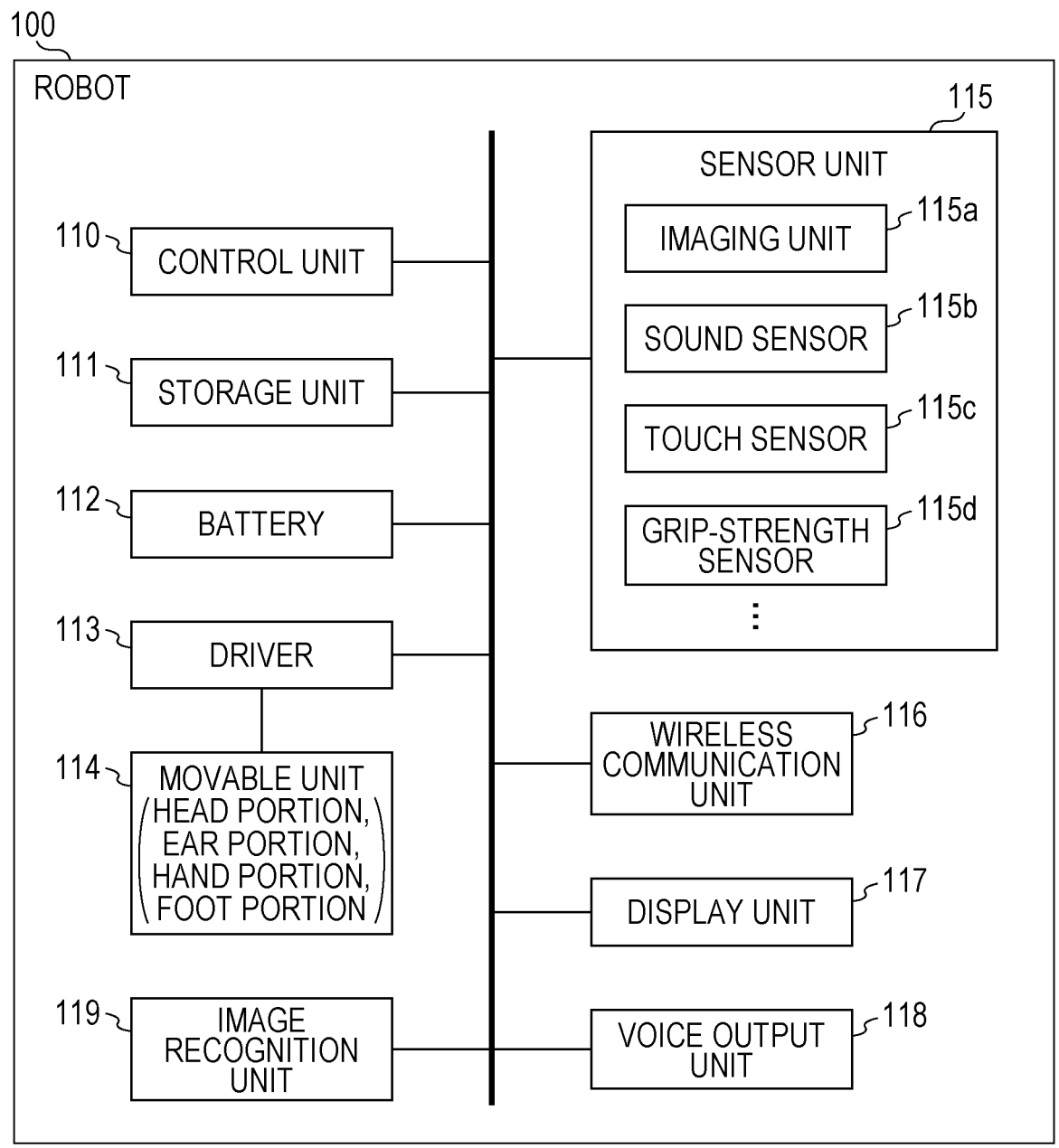
FIG. 2 is a block diagram showing a hardware configuration of the robot according to the first embodiment.

FIG. 2 shows a hardware configuration of the robot 100. As shown in FIG. 2, the robot 100 includes a control unit 110, a storage unit 111, a battery 112, a driver 113, a movable unit 114, a sensor unit 115, a wireless communication unit 116, and a display unit 117, a voice output unit 118, and an image recognition unit 119.

The control unit 110 includes a central processing unit (CPU), a read only memory (ROM), and a random access memory (RAM). The CPU is, for example, a microprocessor or the like that performs various types of processing and operation. In the control unit 110, the CPU loads a control program stored in the ROM and controls the entire motion of the robot 100 using the RAM as a work memory.

The storage unit 111 is a non-volatile memory, such as a flash memory or a hard disk. The storage unit 111 stores programs and data, including an operating system (OS) and application programs, to be used by the control unit 110 to perform various types of processing. The storage unit 111 further stores data generated or acquired by the control unit 110 performing various types of processing.

The battery 112 is a storage battery that stores electrical energy and supplies power to the units of the robot 100. The battery 112 is charged by a charging station when the robot 100 returns to the charging station.

The driver 113 includes the drive members, such as a motor and an actuator that drive the movable unit 114 of the robot 100, and a drive circuit connected to these drive members. The movable unit 114 is a drivable component and specifically includes the head portion 101, the hand portion 107, and the foot portion 108. The control unit 110 transmits a control signal to the drive circuit based on an operation program. The drive circuit supplies a drive pulse signal to the drive members in accordance with the control signal transmitted from the control unit 110. The drive members drive the movable unit 114 in accordance with the pulse signal supplied from the drive circuit.

The robot 100 can operate variously by the driver 113 driving the movable unit 114. For example, the robot 100 can move forward or backward by moving the foot portion 108 and can change its direction. Here, the foot portion 108 includes a wheel, and the driver 113 may rotate the wheel to change the position or the direction of the robot 100. In addition, the robot 100 can imitate human motions and gestures by moving the head portion 101 or the hand portion 107.

The sensor unit 115 includes a plurality of sensors that detects physical quantities around or inside the robot 100. As shown in FIG. 2, the sensor unit 115 includes an imaging unit 115a that images the surroundings, a sound sensor 115b that detects a sound, a touch sensor 115c that detects a touch on the robot 100, and a grip-strength sensor 115d that detects the grip strength. Although not shown, the sensor unit 115 includes a distance sensor that measures the distance to an object in the vicinity, an acceleration sensor that detects the movement of the robot 100, a gyro sensor that detects the rotation of the robot 100, and a geomagnetic sensor that detects the direction of the robot 100, a temperature sensor that detects the temperature around the robot 100, an air-pressure sensor that detects the air pressure around the robot 100, and the like.

The imaging unit 115a is what is called a camera and is installed at the mouth portion 105. The imaging unit 115a includes an image acquisition unit that condenses light emitted from a subject to acquire an image of the subject, and an image processing unit that processes an image acquired by the image acquisition unit. The sound sensor 115b is installed at the head portion 101 and detects a voice emitted from the user, the ambient sound, and the like. Although not shown, the robot 100 includes a plurality of microphones as the sound sensor 115b so as to surround the head portion 101, and can efficiently detect sounds generated in all directions.

The touch sensor 115c is installed at each place of the robot 100 and detects, when the user touches the surface of the robot 100, the position of the touch. The grip-strength sensor 115d is installed at each of the left and right hand portions 107 and measures the grip strength when the hand portion 107 is held by the user. For example, when the user holds the hand portion 107, the grip-strength sensor 115d detects the load by a strain sensor and measures the grip strength by a method of converting the detected load into an electric signal.

The other sensors are installed at various places of the robot 100 and acquire information indicating the state around or inside the robot 100. The sensor unit 115 acquires information indicating a state around or inside the robot 100 using the sensors and supplies the information to the control unit 110.

The wireless communication unit 116 includes an interface for wirelessly communicating with an external apparatus. Under the control of the control unit 110, the wireless communication unit 116 wirelessly communicates with an external apparatus, such as a charging station for charging the robot 100 and a cloud server, in accordance with, for example, the communication standards, such as the wireless local area network (LAN), Wireless Fidelity (Wi-Fi), Bluetooth (registered trademark), or Near Field Communication (NFC).

The display unit 117 is a display device, such as a liquid crystal display, an organic Electro Luminescence (EL) display, or a Light Emitting Diode (LED). The display unit 117 is installed at the eyeball part of each eye portion 104 and displays various images depending on the situation under the control of a display drive circuit (not shown).

The voice output unit 118 includes an audio speaker and a voice output interface, converts voice data generated by the control unit 110 into a voice, and outputs the voice to the outside. The speaker is installed at the head portion 101. The voice output unit 118 outputs various voices including animal sounds and human words. For example, the robot 100 collects the voice of the user with the sound sensor 115b and outputs a voice responding to the user's speech from the voice output unit 118. This enables the robot 100 to have a simple conversation with the user.

The image recognition unit 119 includes a processor for image processing, such as a digital signal processor (DSP) or a graphics processing unit (GPU), and a buffer memory that temporarily stores an image to be processed, and recognizes an image imaged by the imaging unit 115a. The image recognition unit 119 recognizes a person, a face, an object, a pattern, and the like included in an image imaged by the imaging unit 115a using a known image recognition method. The image recognition unit 119 recognizes the face of the predetermined target imaged by the imaging unit 115a.

Figure 3:
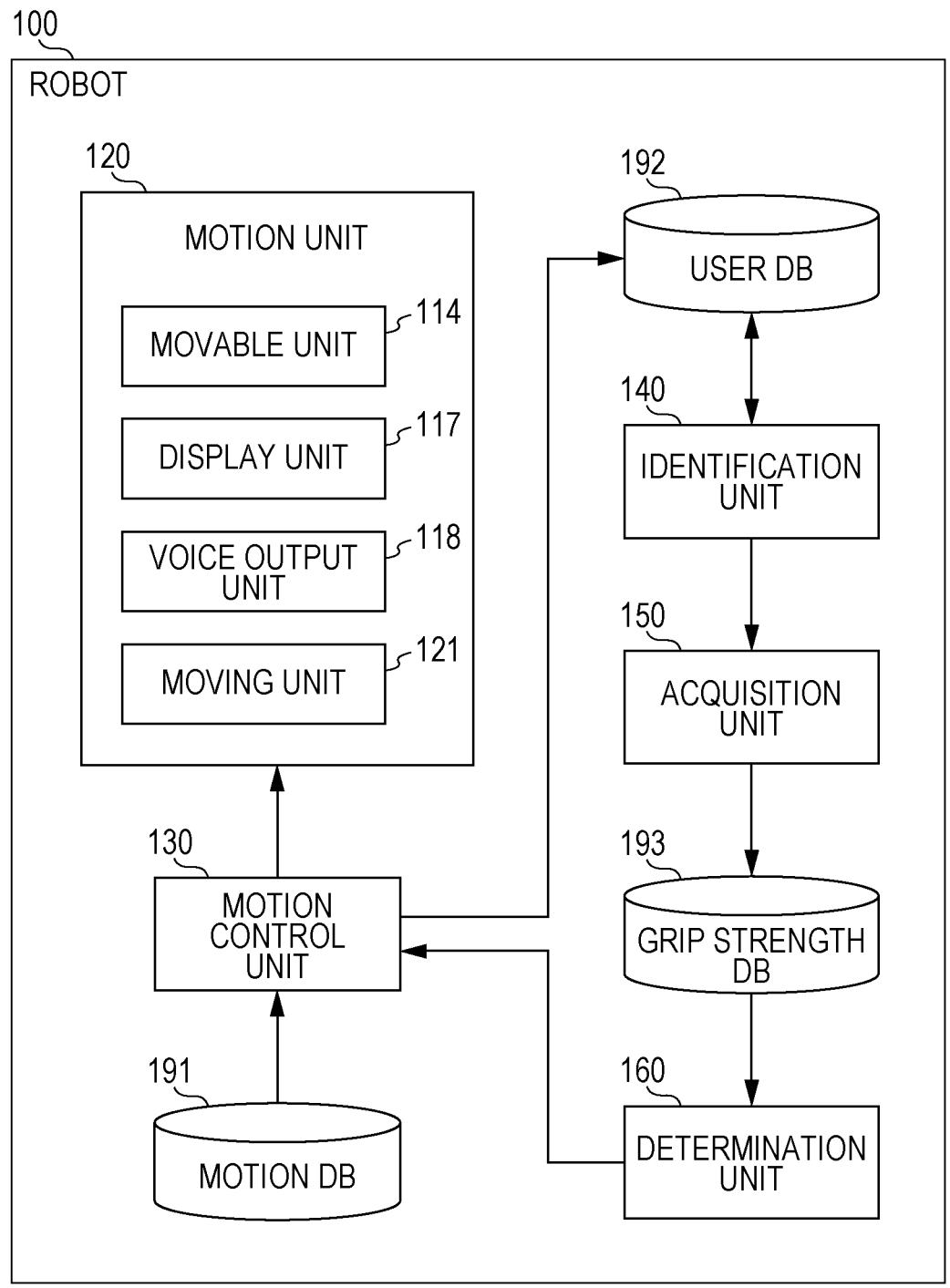
FIG. 3 is a block diagram showing a functional configuration of the robot according to the first embodiment.

Next, a functional configuration of the robot 100 is described with reference to FIG. 3. As shown in FIG. 3, the robot 100 functionally includes a motion unit 120, a motion control unit 130, an identification unit 140, an acquisition unit 150, and a determination unit 160. The motion control unit 130, the identification unit 140, the acquisition unit 150, and the determination unit 160 function by, in the control unit 110, the CPU loading a program stored in the ROM into the RAM and executing the loaded program to perform control.

The robot 100 further includes a motion database (DB) 191, a user DB 192, and a grip strength DB 193. These DBs are each built in an appropriate storage area of the storage unit 111.

The motion unit 120 operates the robot 100. As shown in FIG. 3, the motion unit 120 includes a movable unit 114, a display unit 117, and a voice output unit 118.

The motion control unit 130 controls the motion unit 120 to cause the robot 100 to perform various predetermined motions. For example, the motion control unit 130 moves the head portion 101, the hand portion 107, and the foot portion 108 provided as the movable unit 114 to change the position, direction, posture, and the like of the robot 100. The motion control unit 130 moves the foot portion 108 back and forth and right and left, or rotates a wheel provided to the foot portion 108 to move the robot 100. The motion control unit 130 displays an image expressing a facial expression on the display unit 117. The motion control unit 130 further interacts with the user by outputting a voice from the voice output unit 118. In this manner, the motion control unit 130 causes the robot 100 to perform various motions. The motion control unit 130 is implemented by the control unit 110 cooperating with the driver 113, the movable unit 114, the display unit 117, and the voice output unit 118.

The motions of the robot 100 are predetermined in the motion DB 191. The motion DB 191 defines motions to be performed by the robot 100. The motion control unit 130 causes the robot 100 to perform various motions by referring to the motion DB 191 and controlling the motion unit 120 depending on a situation.

FIG. 4 shows specific examples of motions defined in the motion DB 191. As shown in FIG. 4, the motion DB 191 defines motions to be performed by the robot 100 in each condition. For example, when detecting that "a person has been recognized" with the imaging unit 115a, the motion control unit 130 causes the robot 100 to perform a motion "move toward the person expressing interest". In addition, when detecting that "music has been heard" with the sound sensor 115b, the motion control unit 130 causes the robot 100 to perform a motion "move around happily". In this manner, the motion DB 191 defines the motions to be performed by the robot 100 depending on various situations that can occur.

The identification unit 140 identifies a user who is the predetermined target. Specifically, the identification unit 140 images the surroundings with the imaging unit 115a and acquires an image showing the surroundings. Then, when the user is included in the image acquired by the imaging unit 115a, the identification unit 140 recognizes the face of the user with the image recognition unit 119. The identification unit 140 identifies the user by referring to the user DB 192 and specifying a face image corresponding to the recognized face.

The user DB 192 stores information on a plurality of users which can be a predetermined target. FIG. 5 shows, as an example, information stored in the user DB 192. As shown in FIG. 5, the user DB 192 stores the user ID, the face image data, the examination history of the physical function, and the training history of the physical function of each of the plurality of users in association with each other.

The identification unit 140 determines whether the face images stored in the user DB 192 includes the face image matching the user's face imaged by the imaging unit 115a. When the face image matching the imaged face is stored in the user DB 192 as the result of the determination, the identification unit 140 identifies the imaged user as the user corresponding to the face image. The identification unit 140 thereby authenticates the user around the robot 100. The identification unit 140 is implemented by the control unit 110 cooperating with the image recognition unit 119.

More specifically, the identification unit 140 identifies the user when at least one of the left and right hand portions 107 is held by the user. For example, while the robot 100 is operating, the user holds the hand portion 107 of the robot 100 as a part of interaction with the robot 100. Here, holding means that the user touches and grips (grabs) the hand portion 107 of the robot 100 with the user's hand.

Figure 6:
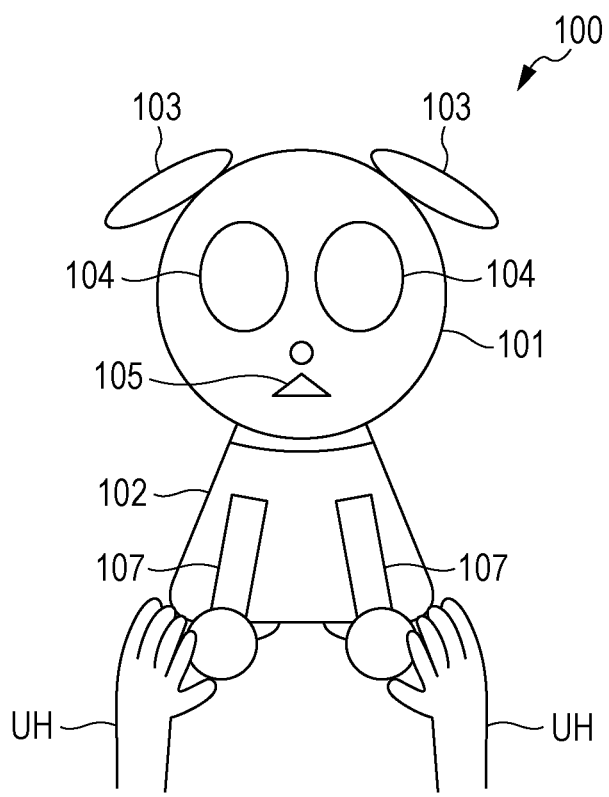
FIG. 6 is a diagram showing that the left and right hand portions of the robot according to the first embodiment are held by a user.

Specifically, FIG. 6 shows that the left and right hand portions 107 of the robot 100 are held by the user. As shown in FIG. 6, the user holds the left hand portion 107 of the robot 100 with the user's right hand UH and the right hand portion 107 of the robot 100 with the user's left hand UH while facing the robot 100. The left and right hand portions 107 of the robot 100 function as holding portions to be held by the user in this manner.

When at least one of the left and right hand portions 107 is held by the user, the identification unit 140 detects a touch due to the holding with the touch sensor 115c. The face of the user can probably face the robot 100 while the hand portion 107 is being held, and the imaging unit 115a provided at the mouth portion 105 of the robot 100 can image the user's face easily. Thus, it is possible for the identification unit 140 to accurately recognize the user by identifying the user when the user holds the hand portion 107.

Returning to FIG. 3, when at least one of the left and right hand portions 107 is held by the user, the acquisition unit 150 acquires physical information on the user's physical function. The physical function is a function for causing the body of the user who is the predetermined target to act normally. In the following, a case where the acquisition unit 150 acquires physical information on the user's brain function, more specifically, on the user's cognitive function, is described as the user's physical function. Here, the cognitive function is a function for the user to correctly recognize the external world and to act properly, and tends to deteriorate with age as a general tendency.

The acquisition unit 150 acquires, as physical information, the grip strength of the user measured by the grip-strength sensor 115d. As shown in FIG. 6, while the user is holding at least one of the left and right hand portions 107, the acquisition unit 150 acquires the grip strength of the user holding the hand portion 107 with the grip-strength sensor 115d provided at the hand portion 107.

Figure 7A:
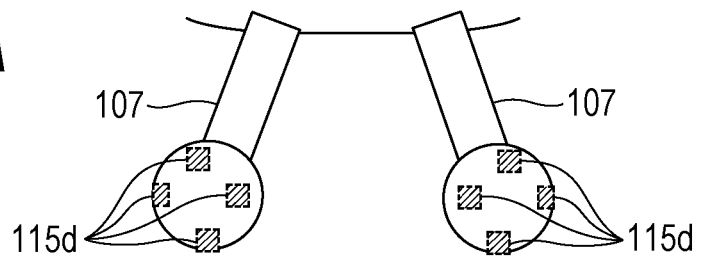
FIG. 7A is a diagram showing an arrangement example of grip-strength sensors on the hand portions of the robot according to the first embodiment.
Figure 7B:
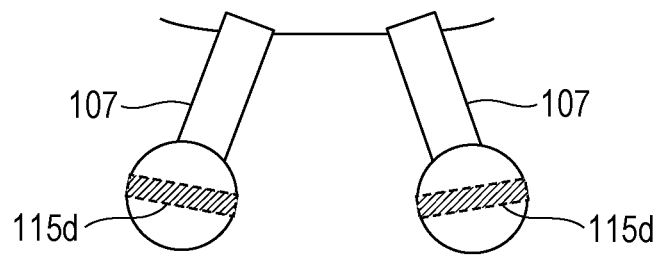
FIG. 7B is a diagram showing an arrangement example of grip-strength sensors on the hand portions of the robot according to the first embodiment.

The grip-strength sensors 115d are provided at positions to easily measure the grip strength on the left and right hand portions 107 so that the grip strength can be measured accurately. Specifically, FIGS. 7A and 7B show arrangement examples of the grip-strength sensors 115d on the left and right hand portions 107 of the robot 100. For example, as shown in FIG. 7A, in order to measure the grip strength regardless of how the user holds the hand portions 107, a plurality of grip-strength sensors 115d is arranged so as to be scattered in all over the end portions of the left and right hand portions 107. Alternatively, as shown in FIG. 7B, in order for the user's fingers to touch the grip-strength sensors 115d when the user holds the hand portions 107 from the left and right sides, the grip-strength sensors 115d may be arranged on the left and right hand portions 107 so as to extend in the lateral direction. In addition, although not shown, a recess or opening may be provided at positions at which the user touches with the user's fingers so that the user can easily recognize the positions to touch with fingers, and the grip-strength sensors 115d may be provided at the positions.

Figures 8, 9:
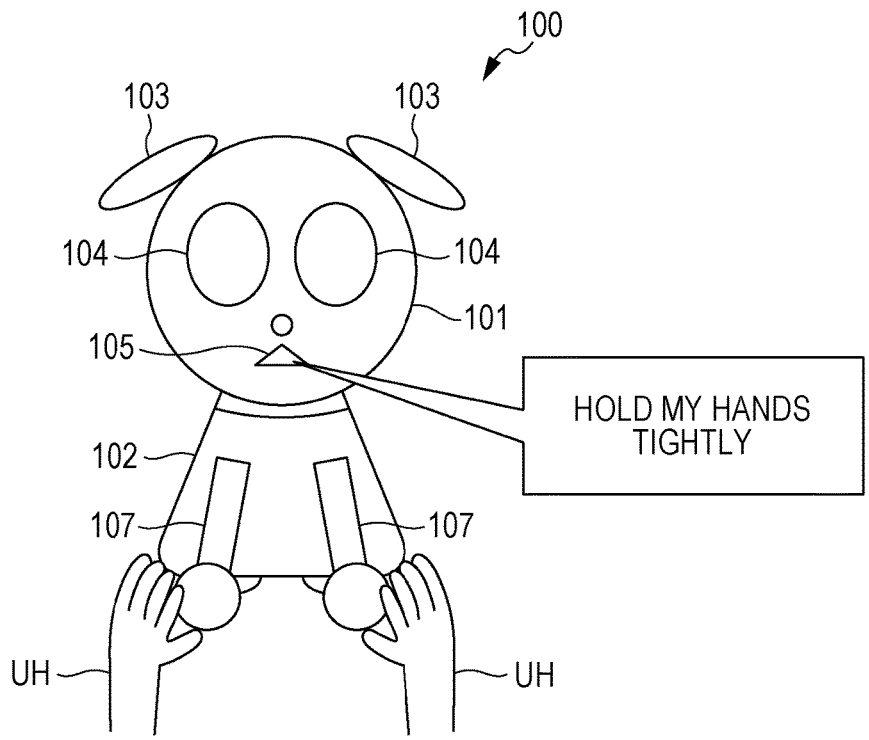
FIG. 8 is a diagram showing an example in which the robot according to the first embodiment requests the user to hold the hand portions tightly.
FIG. 9 is a table showing, as an example, grip strength information stored in a grip strength DB of the robot according to the first embodiment.

In order for the acquisition unit 150 to acquire the grip strength, when the touch sensor 115c detects that at least one of the left and right hand portions 107 is held by the user, the motion control unit 130 controls the motion unit 120 to cause the robot 100 to perform a motion for requesting the user to hold the hand portion 107 more tightly. Specifically, as shown in FIG. 8, while the left and right hand portions 107 are being held by the user, the motion control unit 130 outputs the voice "hold my hands tightly" from the voice output unit 118. After the motion control unit 130 requests the user to hold the hand portion 107 more tightly with such a voice, the acquisition unit 150 acquires the grip strength measured by the grip-strength sensor 115d. The user holds the hand portion 107 tightly in response to the request, and the acquisition unit 150 can appropriately acquire the grip strength of the user.

When the user holds the hand portion 107, the motion control unit 130 may control the motion unit 120 to show a reaction making the user want to hold the hand portion 107 more tightly. For example, when the user holds the hand portion 107, the motion control unit 130 displays an image showing a smiling expression on the display unit 117 installed at the eye portion 104. Alternatively, the motion control unit 130 may move the movable unit 114 to cause the robot 100 to perform a fun motion. In addition, the motion control unit 130 may randomly change expressions or motions so as to make the user want to hold the hand portion 107 continuously and so as not to make the user get bored.

When acquiring the grip strength, the acquisition unit 150 stores the value of the acquired grip strength in the grip strength DB 193. Specifically, when each of the left and right hand portions 107 is held by the user for a predetermined time or more, the acquisition unit 150 registers, in the grip strength DB 193, the largest value of the grip strength among the values of the measured grip strengths of each of the left and right hand portions 107.

FIG. 9 shows, as an example, information stored in the grip strength DB 193. As shown in FIG. 9, the grip strength DB 193 chronologically stores, as values indicating the grip strengths acquired by the acquisition unit 150, the values of the grip strengths of the user's right hand, the values of the grip strengths of the user's left hand, and the average values of the grip strengths of the user's right and left hands in association with the date and time when the grip strengths were acquired. The information stored in the grip strength DB 193 is linked to the IDs of the users stored in the user DB 192. The grip strength DB 193 stores the history of the grip strengths acquired by the acquisition unit 150 for each user.

Every time the acquisition unit 150 acquires the grip strength, the acquisition unit 150 adds, to the grip strength DB 193, the value indicating the newly acquired grip strength together with the acquisition date and time in the history of the grip strengths linked to the user ID identified by the identification unit 140. In this manner, the acquisition unit 150 updates the grip strength DB 193 as required. The acquisition unit 150 is implemented by the control unit 110 cooperating with the grip-strength sensor 115d.

Returning to FIG. 3, the determination unit 160 determines, based on the grip strength acquired by the acquisition unit 150, whether the user's brain function has deteriorated. Recent research results regarding the relationship between grip strength and brain function have shown that people with weak grip tend to deteriorate brain function. For example, Clouston S A, et al. "The dynamic relationship between physical function and cognition in longitudinal aging cohorts." Epidemiol Rev. 2013; 35:33-50. discloses that deterioration in physical function including grip strength relates to deterioration in cognition function.

Based on the relationship between grip strength and brain function, the determination unit 160 determines whether the user's brain function is abnormal. Specifically, the determination unit 160 determines whether the grip strength acquired by the acquisition unit 150 is below a predetermined threshold. Then, when the grip strength acquired by the acquisition unit 150 is lower than the predetermined threshold, the determination unit 160 determines that the user's brain function has deteriorated.

Figure 10:
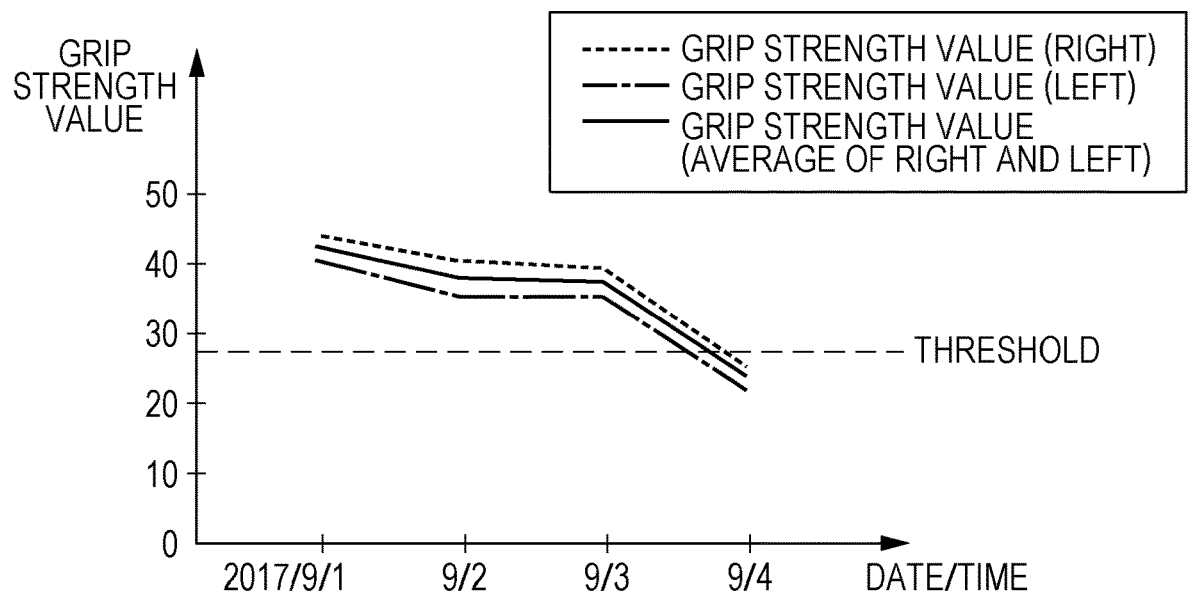
FIG. 10 is a graph showing a change in the values of grip strengths stored in the grip strength DB shown in FIG. 8.

FIG. 10 shows a change in the grip strengths of a user stored in the grip strength DB 193 shown in FIG. 9. In FIG. 10, the dotted line indicates the values of the grip strengths of the right hand, the alternate long and short dashed line indicates the values of the grip strengths of the left hand, and the solid line indicates the average values of the grip strengths of the right and left hands. In the example shown in FIG. 10, the latest grip strength acquired on September 4 has lowered compared to the grip strengths acquired in the last three days. The determination unit 160 determines whether the latest grip strength is lower than a predetermined threshold.

Here, the predetermined threshold is determined based on the past history of the grip strengths of the user acquired by the acquisition unit 150. Specifically, if the grip strength acquired on September 4 is the latest as shown in FIGS. 9 and 10, the determination unit 160 sets a predetermined threshold based on the previously acquired grip strengths of the same user. For example, the determination unit 160 sets, as a predetermined threshold, a value obtained by multiplying the average value of the grip strengths acquired from September 1 to 3 by a predetermined ratio. The predetermined ratio is a value that is greater than 0 and less than 1 and is preset to a value from which it can be determined that the grip strength has lowered significantly compared to the past grip strengths. The determination unit 160 updates the predetermined threshold each time a new grip strength is registered in the grip strength DB 193.

The determination unit 160 determines whether the newly acquired grip strength is below the threshold set based on the past grip strengths of the user. In this manner, the determination unit 160 determines whether the grip strength of the user has significantly lowered compared to the past grip strengths. For example, in FIG. 10, the latest grip strength acquired on September 4 is below the predetermined threshold indicated by the broken line. As described above, when at least one of the value of the right grip strength, the value of the left grip strength, and the average value thereof is below the predetermined threshold, the determination unit 160 determines that the grip strength of the user has lowered below the predetermined threshold. In this case, the determination unit 160 determines that the user's brain function has deteriorated.

On the other hand, when the grip strength acquired by the acquisition unit 150 is equal to or higher than the predetermined threshold, the determination unit 160 determines that the grip strength of the user has not significantly lowered compared to the past grip strengths. In this case, the determination unit 160 determines that the user's brain function has not deteriorated.

In this manner, the determination unit 160 diagnoses, based on the grip strength acquired by the acquisition unit 150, whether there is a concern about an abnormality in the user's brain function. The determination unit 160 is implemented by the control unit 110 cooperating with the storage unit 111.

The motion control unit 130 controls the motion unit 120 depending on the grip strength of the user acquired by the acquisition unit 150 to cause the robot 100 to perform at least one of an examination operation for examining the user's brain function and a training support operation for training the user's brain function. Specifically, when the determination unit 160 determines that the user's brain function has deteriorated and when the user's brain function has not been examined within the latest predetermined period, the motion control unit 130 controls the motion unit 120 to cause the robot 100 to perform the examination operation.

The examination operation is an operation for examining whether there is an abnormality in the user's cognitive function, and is, more specifically, an operation for examining whether the user suffers from dementia. When the determination unit 160 determines that the grip strength of the user is lower than the predetermined threshold, the user's brain function can have deteriorated. In this case, the motion control unit 130 causes the robot 100 to perform the examination operation to examine in more detail whether the user's brain function is abnormal.

Figure 11:
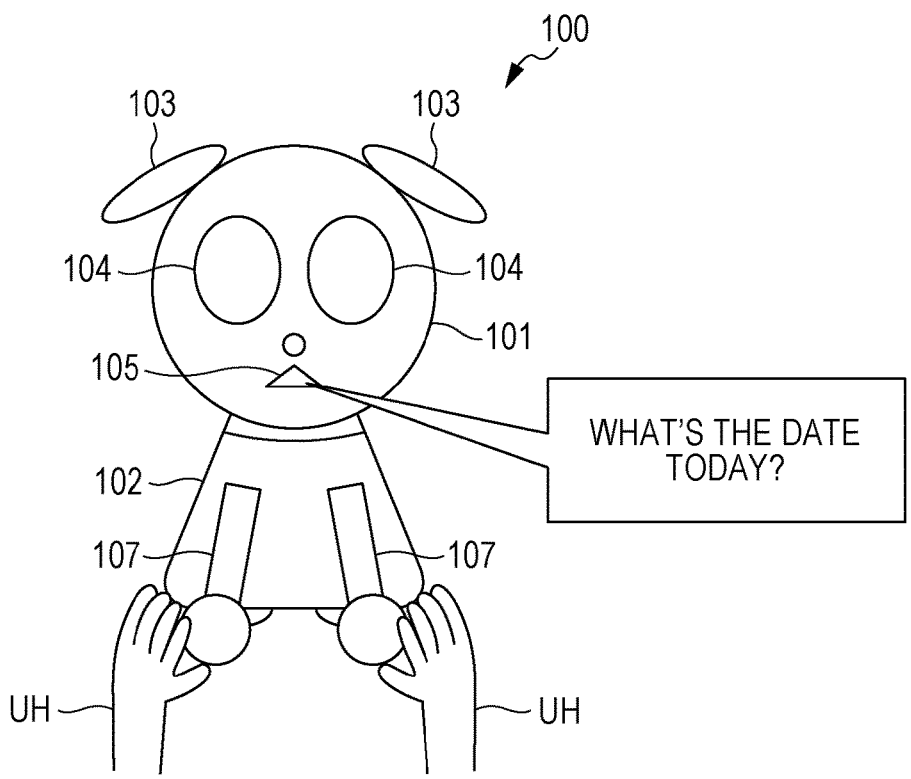
FIG. 11 is a diagram showing a first example in which the robot according to the first embodiment performs an examination operation.
Figure 12:
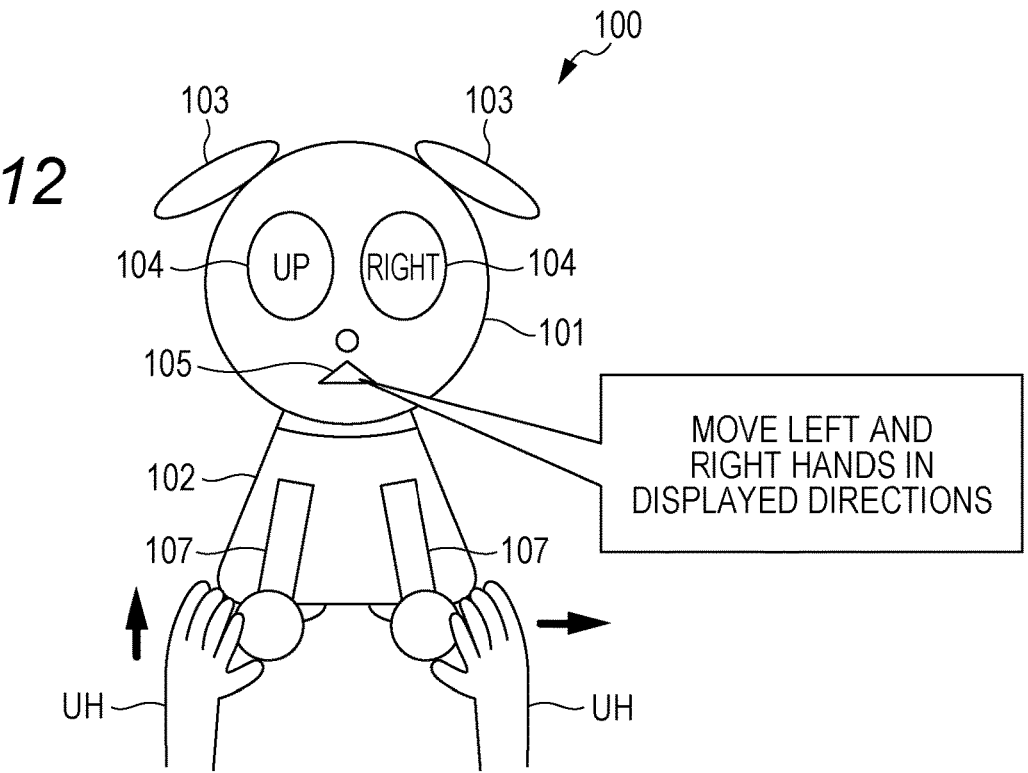
FIG. 12 is a diagram showing a second example in which the robot according to the first embodiment performs an examination operation.

FIGS. 11 and 12 each show that the robot 100 is performing an examination operation. The examination operation shown in FIG. 11 is an operation for examining whether the user can answer a simple date question. In order to cause the robot 100 to perform the examination operation shown in FIG. 11, the motion control unit 130 outputs, from the voice output unit 118, a voice for asking the date of today. The examination operation shown in FIG. 12 is an operation for examining the user's attentiveness and reactiveness. In order to cause the robot 100 to perform the examination operation shown in FIG. 12, the motion control unit 130 displays images indicating the directions on the left and right eye portions 104 and outputs, from the voice output unit 118, a voice instructing the user to move the left and right hand portions 107 in the directions displayed on the left and right eye portions 104 respectively.

The acquisition unit 150 acquires examination information indicating an examination result by detecting the user's response to the examination operation. For example, when the examination operation shown in FIG. 11 is performed by the robot 100, the user answers the date of today aloud. The acquisition unit 150 detects a voice emitted from the user with the sound sensor 115*b*. The acquisition unit 150 thereby acquires examination information indicating whether the user has correctly answered the simple date question.

Alternatively, when the examination operation shown in FIG. 12 is performed by the robot 100, the user moves the holding left and right hand portions 107 of the robot 100 in the directions corresponding to the instructions like levers. For example, the user moves the right hand portion 107 of the robot 100 upward in response to the word "up" displayed on the right eye portion 104 of the robot 100. The user further moves the left hand portion 107 of the robot 100 to the right in response to the word "right" displayed on the left eye portion 104 of the robot 100. The acquisition unit 150 detects the directions in which the hand portions 107 are moved by the user. The acquisition unit 150 thereby acquires examination information indicating the user's attentiveness and reactiveness.

The determination unit 160 determines, based on the examination information acquired by the acquisition unit 150, whether the user's brain function has deteriorated. For example, the determination unit 160 determines whether the correct date response to the examination operation shown in FIG. 11 has been obtained from the user. Alternatively, the determination unit 160 determines whether the correct direction input at an appropriate timing in response to the examination operation shown in FIG. 12 has been obtained from the user.

When a normal response to the examination operation has been obtained from the user, the determination unit 160 determines that the user's brain function is normal and the user does not suffer from dementia. On the other hand, when a normal response to the examination operation has not been obtained from the user, the determination unit 160 determines that the user's brain function has deteriorated and the user can suffer from dementia. When determining whether the user's brain function has deteriorated based on the examination information, the determination unit 160 stores the examination result in the user DB 192 in association with the date and time.

The motion control unit 130 may cause the robot 100 to perform, as an examination operation, any operation other than the operation shown in FIG. 11 or 12 as long as the brain function can be examined with the operation. For example, although not shown, the motion control unit 130 may display a character (kanji) and a calculation task on the display unit 117 and make the user answer how to read the kanji and the calculation result.

The motion control unit 130 causes the robot 100 to perform such an examination operation when the user's brain function has not been examined within the latest predetermined period. The latest predetermined period is a past period having a preset time length based on the present time and is a period of about one month as an example.

On the other hand, when the determination unit 160 determines that the user's brain function has deteriorated and when the user's brain function has been examined within the latest predetermined period, the motion control unit 130 controls the motion unit 120 to cause the robot 100 to perform a training support operation.

The training support operation is an operation for preventing the user from suffering from dementia by making the user train the brain function. When the user's brain function has been examined within the latest predetermined period, the motion control unit 130 can probably obtain the same result although the examination is performed again. Accordingly, in this case, the motion control unit 130 causes the robot 100 to perform a training support operation for training the user's brain function instead of the examination operation.

Figure 13:
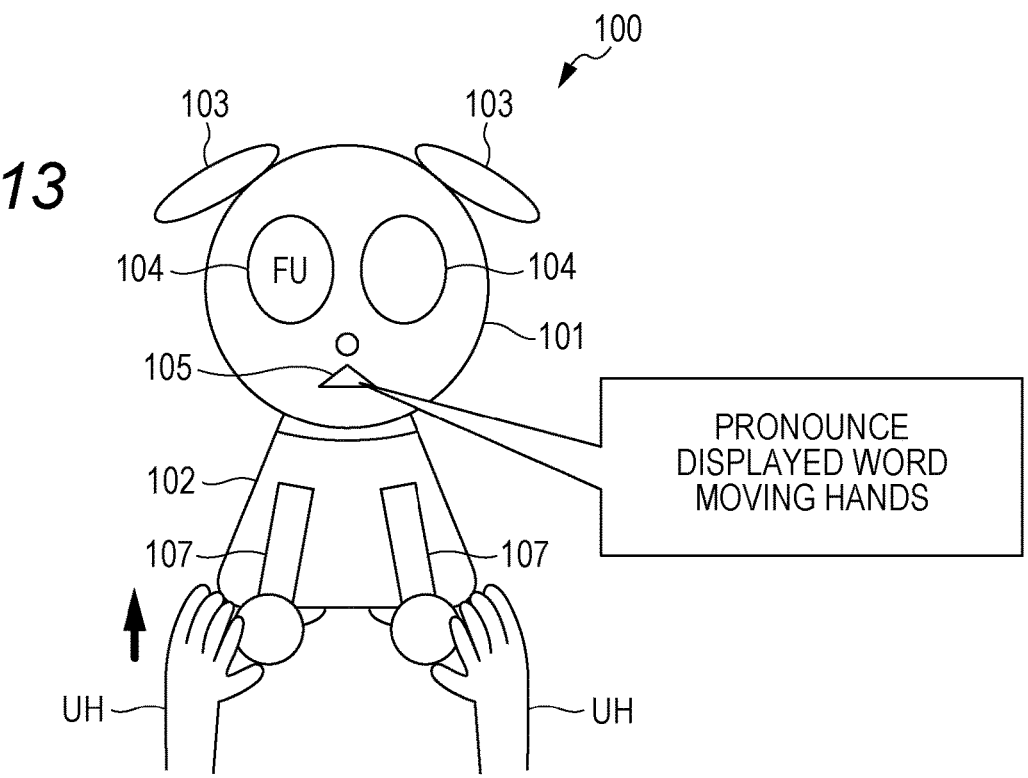
FIG. 13 is a diagram showing an example in which the robot according to the first embodiment performs a training support operation.

FIG. 13 shows that the robot 100 is performing a training support operation. The training support operation shown in FIG. 13 is an operation for training the user's attentiveness and linguistic competence. In order to cause the robot 100 to perform the training support operation shown in FIG. 13, the motion control unit 130 displays a character on at least one of the left and right eye portions 104 at a predetermined timing and outputs, from the voice output unit 118, a voice instructing the user to pronounce the displayed character and to move the hand portion 107.

In response to the training support operation, the user moves one of the holding left and right hand portions 107 of the robot 100 like levers while pronouncing the displayed character ("Fu" in the example of FIG. 13). For example, when a character is displayed on the left eye portion 104, the user moves the left hand portion 107 while pronouncing the displayed character. When a character is displayed on the right eye portion 104, the user moves the right hand portion 107 while pronouncing the displayed character. With such a training support operation, the user makes a move while causing the brain to work actively, and it is possible for the user to train the brain function and the cognitive function.

The motion control unit 130 may cause the robot 100 to perform, as a training support operation, any operation other than the operation shown in FIG. 13 as long as the brain function can be trained with the operation. For example, although not shown, the motion control unit 130 may display a task related to words or numbers on the display unit 117 as a training support operation. Alternatively, the motion control unit 130 may cause the robot 100 to perform, as a training support operation, a game (so-called spotting the differences) in which an image is displayed on each of the left and right eye portions 104 in order for the user to spot the differences between the images displayed on the left and right eye portions 104. When causing the robot 100 to perform a training support operation, the motion control unit 130 stores the details of the training support operation in the user DB 192 in association with the date and time.

Figure 14:
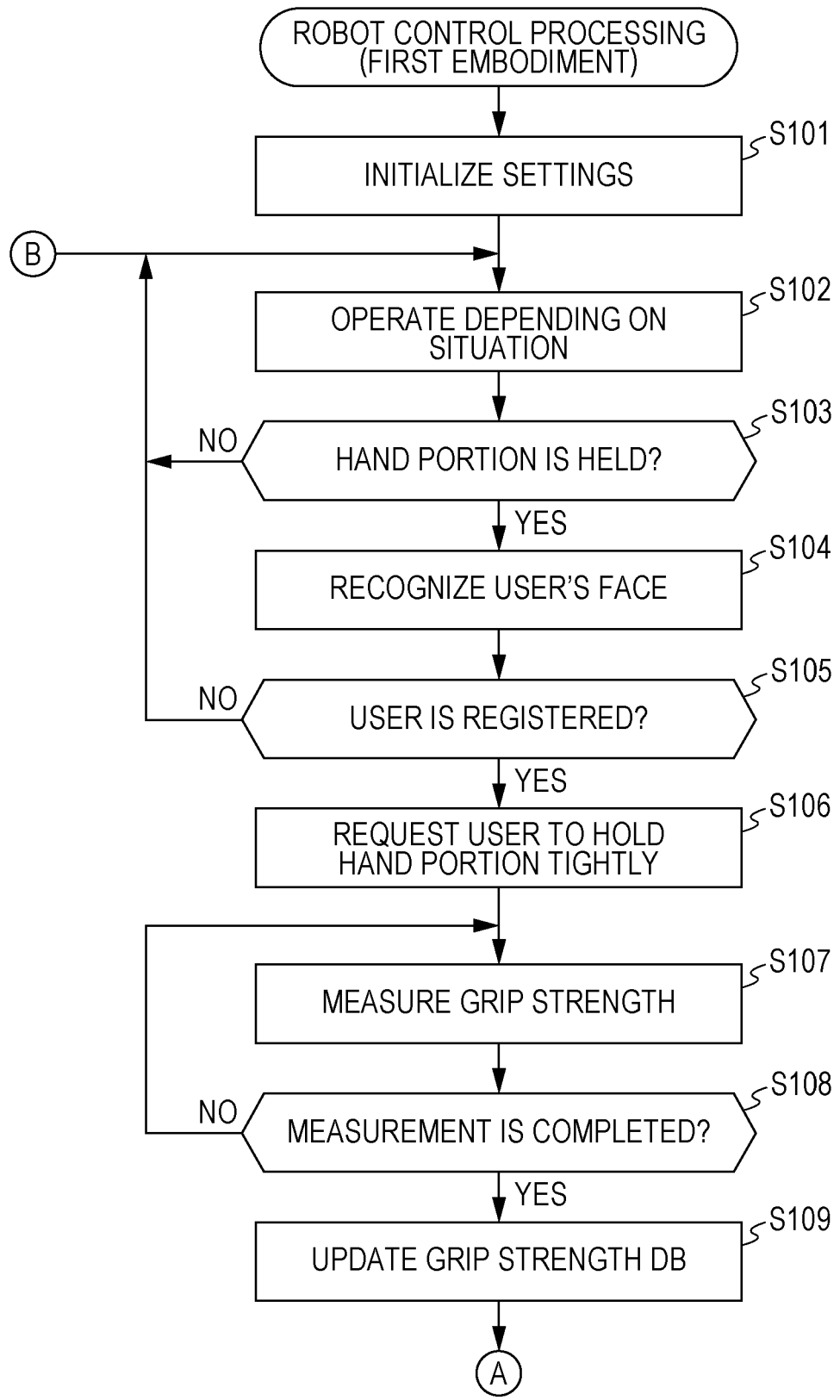
FIG. 14 is a first flowchart showing a procedure of robot control processing to be performed by the robot according to the first embodiment.

A procedure of robot control processing of the robot 100 configured as described above is described with reference to the flowcharts shown in FIGS. 14 and 15. The robot control processing shown in FIG. 14 is started when the robot 100 is ready to operate normally by turning on the power of the robot 100 and charging the battery 112.

When the robot control processing is started, the control unit 110 first initializes various settings (step S101). Then, the control unit 110 causes the robot 100 to perform various motions depending on a situation (step S102). Specifically, the control unit 110 determines whether any one of a plurality of conditions defined in the motion DB 191 as conditions for causing the robot 100 to operate has been satisfied. Then, the control unit 110 controls the motion unit 120 depending on the satisfied condition to cause the robot 100 to perform an operation.

Next, the control unit 110 determines whether the hand portion 107 has been held (step S103). Specifically, the control unit 110 determines whether the touch sensor 115c has detected a touch on at least one of the left and right hand portions 107. When the hand portion 107 has not been held (step S103; NO), the control unit 110 returns the processing to step S102 and causes the motion unit 120 to perform various motions depending on a situation.

On the other hand, when the hand portion 107 has been held by the user (step S103; YES), the control unit 110 functions as the identification unit 140 to recognize the face of the user (step S104). Specifically, the control unit 110 images the face of the user holding the hand portion 107 with the imaging unit 115a. Then, the control unit 110 recognizes the face of the user included in the imaged image with the function of the image recognition unit 119.

When recognizing the face of the user, the control unit 110 determines whether the user is registered in the user DB 192 (step S105). Specifically, the control unit 110 determines whether the imaged user's face matches any one of the face images of the users stored in the user DB 192 by referring to the user DB 192. As the result of the determination, when the imaged user's face matches a face image in the user DB 192, the control unit 110 determines that the user is registered.

When the user is not registered in the user DB 192 (step S105; NO), the control unit 110 determines that the user whose face has been recognized is not a target for examining or training the brain function. Thus, the control unit 110 does not proceed with the processing to step S106 and the subsequent steps, and returns the processing to step S102. At this time, the control unit 110 may newly register the face image of the user in the user DB 192 as necessary, such as when a registration instruction is newly received from the user.

On the other hand, when the user is registered in the user DB 192 (step S105; YES), the control unit 110 requests the user to hold the hand portions 107 tightly (step S106). For example, as shown in FIG. 8, the control unit 110 outputs a voice such as "Hold my hands tightly" from the voice output unit 118.

When requesting the user to hold the hand portions 107 tightly, the control unit 110 functions as the acquisition unit 150 to measure the grip strength of the user (step S107). Specifically, the control unit 110 measures the grip strength when the hand portions 107 are held by the user with the grip-strength sensor 115d provided at the left and right hand portions 107.

When starting the measurement of the grip strength, the control unit 110 determines whether the measurement of the grip strength has been completed by determining whether a predetermined time has elapsed from the start of the measurement (step S108). When the measurement of the grip strength has not been completed (step S108; NO), the control unit 110 continues the measurement of the grip strength until the measurement of the grip strength is completed at step S107.

When the measurement of the grip strength has been completed (step S108; YES), the control unit 110 registers the measured grip strength in the grip strength DB 193 (step S109). Specifically, the control unit 110 updates the grip strength DB 193 by adding the value of the newly measured grip strength to the history of the grip strengths stored in the grip strength DB 193.

Figure 15:
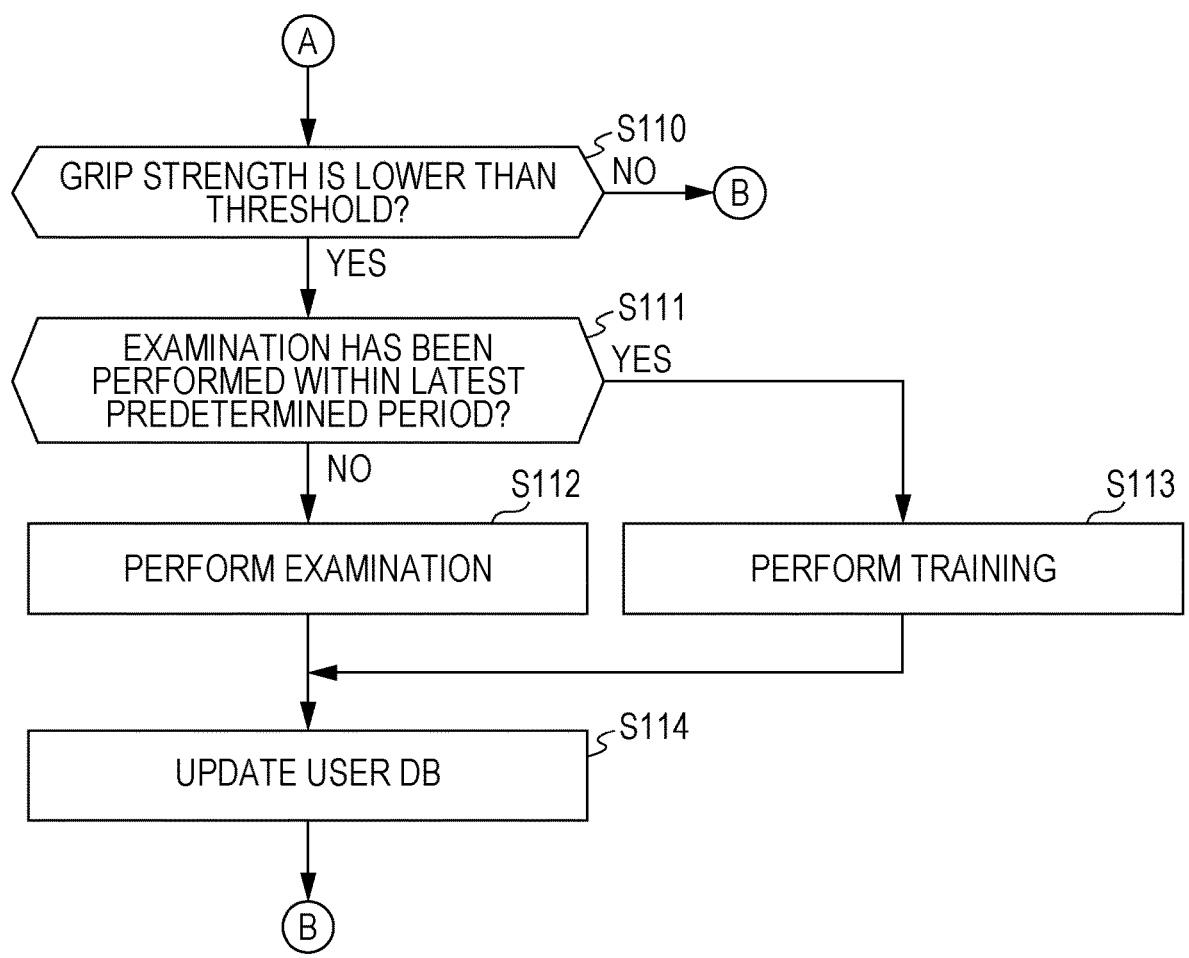
FIG. 15 is a second flowchart showing the procedure of the robot control processing to be performed by the robot according to the first embodiment.

When registering the measured grip strength in the grip strength DB 193, the control unit 110 proceeds with the processing to the flowchart shown in FIG. 15 and functions as the determination unit 160 to determine whether the measured grip strength is lower than a predetermined threshold (step S110). Specifically, the control unit 110 determines whether the newly measured grip strength is less than a threshold determined based on the previously measured grip strengths. The control unit 110 thereby determines whether the grip strength of user has lowered significantly compared to the past grip strengths.

When the measured grip strength is equal to or higher than the predetermined threshold (step S110; NO), the control unit 110 determines that it is not necessary to perform an examination or training of the user's brain function. Thus, the control unit 110 returns the processing to step S102 and causes the robot 100 to perform the normal operation.

On the other hand, when the measured grip strength is lower than the predetermined threshold (step S110; YES), the control unit 110 determines whether the examination of the user's brain function has been performed within the latest predetermined period (step S111). Specifically, the control unit 110 determines, by referring to the user DB 192, whether the last date and time when the user's brain function was examined is within the predetermined period from the present time.

When the examination of the brain function has not been performed within the latest predetermined period (step S111; NO), the control unit 110 performs an examination of the user's brain function (step S112). The control unit 110 causes the robot 100 to perform, for example, the examination operation shown in FIG. 11 or 12. At this time, the control unit 110 detects the user's response to the examination operation through the sound sensor 115b or the hand portions 107. The control unit 110 thereby performs an examination as to whether the user's brain function and cognitive function are normal.

On the other hand, when the examination of the brain function has been performed within the latest predetermined period (step S111; YES), the control unit 110 performs a training of the user's brain function (step S113). The control unit 110 causes the robot 100 to perform, for example, the training support operation shown in FIG. 13. The control unit 110 thereby trains the user's brain function and prevents the user's brain function from deteriorating.

When performing the examination or training of the user's brain function in step S112 or S113, the control unit 110 updates the user DB 192 (step S114). Specifically, when performing the examination of the brain function, the control unit 110 stores the examination result in the user DB 192 together with the date and time. On the other hand, when performing the training, the control unit 110 stores the details of the training in the user DB 192 together with the date and time.

Then, the control unit 110 returns the processing to step S102. Then, while the control unit 110 repeats the processing for measuring the grip strength of the user and causing the robot 100 to perform the examination operation or the training support operation as necessary while continuously causing the robot 100 to perform the normal operation.

As described above, the robot 100 according to the first embodiment acquires, when at least one of the left and right hand portions 107 is held by the user, the grip strength of the user as information indicating whether the user's brain function has deteriorated. Then, the robot 100 according to the first embodiment performs, when the acquired grip strength is lower than the predetermined threshold, at least one of an examination operation for examining the user's brain function and a training support operation for training the user's brain function. As described above, since the robot 100 diagnoses the user's brain function from the grip strength when at least one of the left and right hand portions 107 is held by the user, it is possible for the user to be easily diagnosed as to whether the brain function is normal while interacting with the robot 100. Then, the user can have an examination or training of the brain function depending on the diagnostic result of the grip strength. As a result, the user can easily self-care his/her brain function.

Second Embodiment

Next, a second embodiment of the present invention is described. Descriptions for configurations and functions similar to those of the first embodiment are omitted as appropriate.

The robot 100 according to the first embodiment acquires, as physical information on the physical function of the predetermined target, the grip strength of the user. On the other hand, a robot 100a according to the second embodiment acquires examination information as physical information on the predetermined target by detecting a response of the predetermined target to an examination operation.

Figure 16:
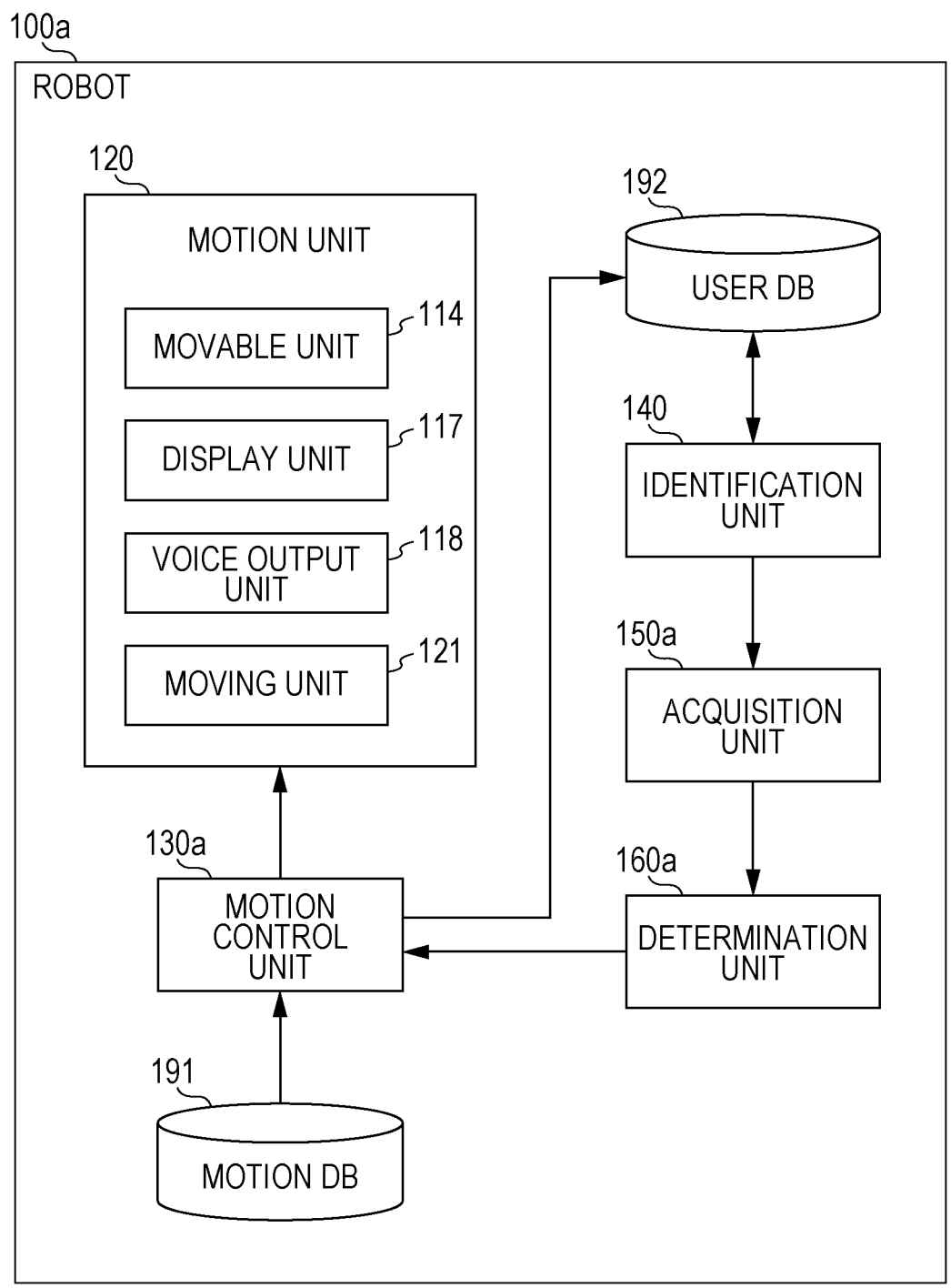
FIG. 16 is a block diagram showing a functional configuration of a robot according to a second embodiment of the present invention.

FIG. 16 shows a functional configuration of the robot 100a according to the second embodiment. As shown in FIG. 16, the robot 100a according to the second embodiment functionally includes a motion unit 120, a motion control unit 130a, an identification unit 140, an acquisition unit 150a, and a determination unit 160a. These units function by, in the control unit 110, the CPU loading a program stored in the ROM into the RAM and executing the loaded program to perform control. The motion unit 120 and the identification unit 140 are similar to those described in the first embodiment, and the descriptions thereof are omitted here.

The robot 100a further includes a motion DB 191 and a user DB 192. These DBs are each built in an appropriate storage area of the storage unit 111.

When at least one of the left and right hand portions 107 of the robot 100a is held by the user, the motion control unit 130a controls the motion unit 120 to cause the robot 100a to perform an examination operation for examining the user's brain function. Here, the examination operation is similar to that described in the first embodiment. Specifically, as shown in, for example, FIG. 11, the motion control unit 130a outputs a voice for asking the date of today from the voice output unit 118. Alternatively, as shown in FIG. 12, the motion control unit 130a displays images indicating directions on the left and right eye portions 104 and outputs, from the voice output unit 118, a voice for instructing the user to move the left and right hand portions 107 in the directions displayed on the left and right eye portions 104 respectively.

The acquisition unit 150a acquires physical information on the user's physical function by detecting the user's response to the examination operation. For example, when the examination operation shown in FIG. 11 is performed by the robot 100a, the user answers the date of today aloud. The acquisition unit 150a detects the voice emitted from the user with the sound sensor 115b. The acquisition unit 150a thereby acquires, as physical information, examination information indicating whether the user has correctly answered the simple date question. Alternatively, when the examination operation shown in FIG. 12 is performed by the robot 100a, the user moves the holding left and right hand portions 107 of the robot 100a in the directions corresponding to the instructions. The acquisition unit 150a detects the directions in which the hand portions 107 have been moved by the user. The acquisition unit 150a thereby acquires, as physical information, examination information indicating the user's attentiveness and reactiveness.

The determination unit 160*a* determines, based on the physical information acquired by the acquisition unit 150*a*, whether the user's physical function has deteriorated. For example, the determination unit 160*a* determines whether the correct date response to the examination operation shown in FIG. 11 has been obtained from the user. Alternatively, the determination unit 160*a* determines whether the correct direction input at an appropriate timing in response to the examination operation shown in FIG. 12 has been obtained from the user.

When a normal response to the examination operation has been obtained from the user, the determination unit 160*a* determines that the user's brain function is normal and the user does not suffer from dementia. On the other hand, when a normal response to the examination operation has not been obtained from the user, the determination unit 160*a* determines that the user's brain function has deteriorated and the user can suffer from dementia. When determining whether the user's brain function has deteriorated based on the physical information, the determination unit 160*a* stores the examination result in the user DB 192 in association with the date and time.

When the determination unit 160*a* determines that the user's brain function has deteriorated, the motion control unit 130*a* controls the motion unit 120 to cause the robot 100*a* to perform a training support operation. Here, the training support operation is similar to that described in the first embodiment. Specifically, as shown in, for example, FIG. 13, the motion control unit 130*a* displays a character on at least one of the left and right eye portions 104 at a predetermined timing and outputs, from the voice output unit 118, a voice instructing the user to pronounce the displayed character and to move the hand portion 107.

In response to the training support operation, the user moves one of the holding left and right hand portions 107 of the robot 100*a* like levers while pronouncing the displayed character. With such a training support operation, the user makes a move while causing the brain to work actively, and it is possible for the user to train the brain function and the cognitive function.

As described above, by training the user's brain function when the user's brain function is determined to have deteriorated as the result of the examination operation, it is possible to prevent the user's brain function from further deteriorating. When causing the robot 100*a* to perform a training support operation, the motion control unit 130*a* stores the details of the training support operation in the user DB 192 in association with the date and time.

Figure 17:
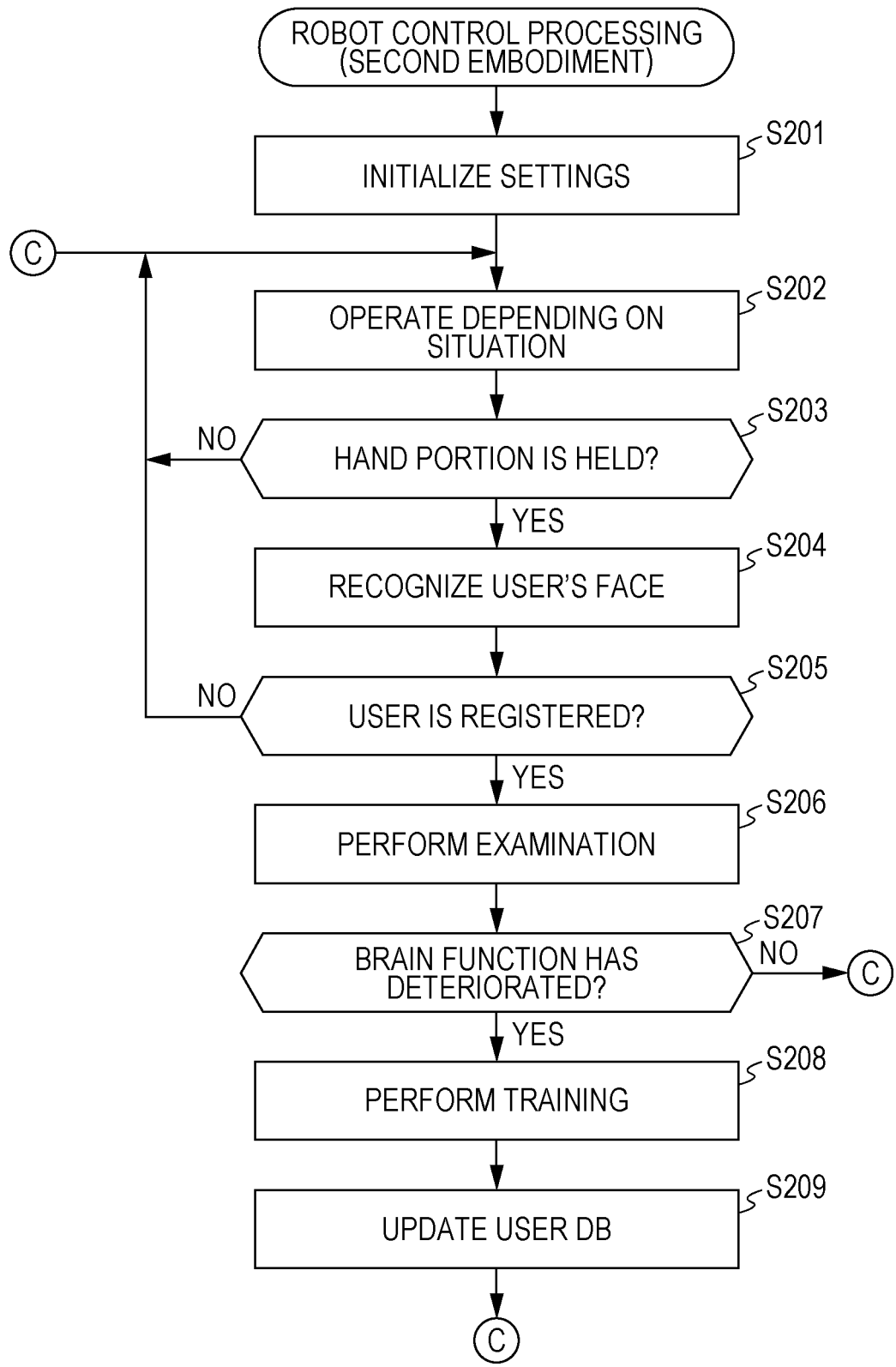
FIG. 17 is a second flowchart showing a procedure of robot control processing to be performed by the robot according to the second embodiment.

With reference to the flowchart shown in FIG. 17, a procedure of robot control processing of the robot 100*a* according to the second embodiment is described. The robot control processing shown in FIG. 17 is started when the robot 100*a* is ready to operate normally by turning on the power of the robot 100*a* and charging the battery 112.

In the robot control processing shown in FIG. 17, the processing from steps S201 to S204 is similar to the processing from steps S101 to S104 shown in FIG. 14. Specifically, when the robot control processing is started, the control unit 110 first initializes various settings (step S201). Then, the control unit 110 causes the robot 100*a* to perform various motions depending on a situation (step S202).

Next, the control unit 110 determines whether the hand portion 107 has been held (step S203). When the hand portion 107 has not been held (step S203; NO), the control unit 110 returns the processing to step S202 and causes the motion unit 120 to perform various motions depending on a situation. On the other hand, when the hand portion 107 has been held by the user (step S203; YES), the control unit 110 functions as the identification unit 140 to recognize the face of the user (step S204).

When recognizing the face of the user, the control unit 110 determines whether the user is registered in the user DB 192 (step S205). When the user is not registered in the user DB 192 (step S205; NO), the control unit 110 determines that the user whose face has been recognized is not a target for examining or training the brain function. Thus, the control unit 110 does not proceed with the processing to step S206 and subsequent steps, and returns the processing to step S202.

On the other hand, when the user is registered in the user DB 192 (step S205; YES), the control unit 110 performs an examination of the user's brain function (step S206). The control unit 110 causes the robot 100*a* to perform, for example, the examination operation shown in FIG. 11 or 12. At this time, the control unit 110 detects the user's response to the examination operation through the sound sensor 115*b* or the hand portions 107. The control unit 110 thereby performs an examination as to whether the user's brain function and cognitive function are normal.

When performing the examination of the brain function, the control unit 110 determines whether the user's brain function has deteriorated (step S207). Specifically, the control unit 110 determines that the user's brain function has not deteriorated when a normal response to the examination operation has been obtained from the user, and determines that the user's brain function has deteriorated when a normal response to the examination operation has not been obtained from the user.

When determining that the user's brain function has not deteriorated (step S207; NO), the control unit 110 determines that it is not necessary to train the user's brain function. Thus, the control unit 110 returns the processing to step S202 and continuously causes the robot 100*a* to perform the normal operation.

On the other hand, when determining that the user's brain function has deteriorated (step S207; YES), the control unit 110 performs training of the brain function (step S208). The control unit 110 causes the robot 100*a* to perform, for example, the training support operation shown in FIG. 13. The control unit 110 thereby trains the user's brain function and prevents the user's brain function from deteriorating.

When performing the training of the brain function, the control unit 110 updates the user DB 192 (step S209). Specifically, when performing the examination of the brain function, the control unit 110 stores the examination result in the user DB 192 together with the date and time. On the other hand, when performing the training, the control unit 110 stores the details of the training in the user DB 192 together with the date and time.

Then, the control unit 110 returns the processing to step S202. Then, while the control unit 110 repeats the processing for causing the robot 100*a* to perform the examination operation or the training support operation as necessary while continuously causing the robot 100*a* to perform the normal operation.

As described above, the robot 100*a* according to the second embodiment performs an examination operation for examining the user's brain function when at least one of the left and right hand portions 107 is held by the user to acquire information indicating whether the user's brain function has deteriorated. Then, the robot 100*a* according to the second embodiment performs a training support operation for training the user's brain function when the brain function is determined to have deteriorated as the result of the examination operation. As described above, since the robot 100*a* performs the examination operation when at least one of the left and right hand portions 107 is held by the user, it is possible for the user to easily have an examination of the brain function while interacting with the robot 100*a*. At this time, it is also possible for the user to train the brain function depending on the examination result. As a result, the user can easily self-care his/her brain function.

In addition, since the robot 100*a* according to the second embodiment does not require a configuration for acquiring the grip strength of the user, it is possible to effectively prevent the user's brain function from deteriorating with a configuration simpler than that in the first embodiment.

(Modification)

The embodiments of the present invention have been described above, but the embodiments are merely examples, and the scope of application of the present invention is not limited thereto. That is, the embodiments of the present invention are applicable in various ways, and any embodiment is included in the scope of the present invention.

For example, in the above embodiments, the motion control unit 130 or 130*a* causes the robot 100 or 100*a* to perform an examination operation or a training support operation while the left and right hand portions 107 are held by the user. Since the face of the user is facing the head portion 101 of the robot 100 or 100*a* when the left and right hand portions 107 are held by the user in this manner, it is possible to accurately recognize the user's expression from the image of the user's face imaged by the imaging unit 115*a*. Thus, the image recognition unit 119 recognizes the face of the user, and the motion control unit 130 or 130*a* may change the examination operation or the training support operation to be performed by the robot 100 or 100*a* depending on a change in the user's facial expression recognized by the image recognition unit 119.

For example, if the user's facial expression becomes clouded during an examination operation or a training support operation, the motion control unit 130 or 130*a* may cause the robot 100 or 100*a* to perform another examination operation or training support operation. Alternatively, if the user has a relatively good expression during an examination operation or a training support operation, the motion control unit 130 or 130*a* may cause the robot 100 or 100*a* to continuously perform the examination operation or the training support operation for the user. This can support the user's self-care more effectively.

In the above embodiments, the acquisition unit 150 or 150*a* acquires, as physical information, information on the brain function and cognitive function of a predetermined target. However, in the present invention, the acquisition unit 150 or 150*a* may acquire information on functions other than the above as physical information.

When at least one of the left and right hand portions 107 is held by the user for a time shorter than a predetermined time, the motion control unit 130 or 130*a* may control the motion unit 120 to cause the robot 100 or 100*a* to perform an operation for requesting the user to hold the hand portion 107 for a longer time. The predetermined time is a time predetermined as the time required to acquire physical information, and specifically, is the time required to measure the grip strength of the user or to examine the user's physical function. For example, when the user weakens the strength for holding the hand portion 107 before the predetermined time elapses from the start of the holding, the motion control unit 130 or 130*a* outputs, from the voice output unit 118, a voice for requesting the user not to weaken the strength for holding for a while.

The motion control unit 130 or 130*a* may cause the robot 100 or 100*a* to perform an operation for encouraging the user to hold the hand portion 107 when the user's physical information has not been acquired for a predetermined period (for example, one month). For example, the motion control unit 130 or 130*a* may cause a moving unit 121 to move the robot 100 or 100*a* toward the user while stretching the hand portions 107 in front of the robot 100 or 100*a*. By periodically acquiring the user's physical information in this manner, it is possible to determine whether the user's physical function has deteriorated and to effectively support the user's self-care.

When the determination unit 160 or 160*a* determines that the user's physical function has deteriorated, the motion control unit 130 or 130*a* may change the number, type, or difficulty of training support operations to be performed by the robot 100 or 100*a* depending on the deterioration level of the physical function, that is, the degree of deterioration of the physical function. For example, the motion control unit 130 or 130*a* may increase the number of training support operations when the deterioration level of the physical function is relatively high. Alternatively, when it is determined that the user's physical function has not been improved by an examination operation performed after the training support operation, the motion control unit 130 or 130*a* may change the type or difficulty of the training support operation to be performed by the robot 100 or 100*a*. In this manner, by making the user perform highly effective training depending on a situation, it is possible to properly support the user's self-care.

In the above embodiments, the robot 100 or 100*a* is a robot that has a shape imitating a dog. However, the robot 100 or 100*a* according to the present invention may have any shape. For example, the robot 100 or 100*a* according to the present invention may imitate another animal, such as a cat, a mouse, or a rabbit, in appearance or may imitate a human.

In the above embodiments, the display unit 117 is provided at the eye portion 104, and the imaging unit 115*a* is provided at the mouth portion 105. However, in the present invention, the display unit 117 may be provided at a position other than the eye portion 104, and the imaging unit 115*a* may be provided at a position other than the mouth portion 105 (for example, a nose or the like).

In the above embodiments, the motion DB 191, the user DB 192, and the grip strength DB 193 are provided in the robot 100 or 100*a*. However, in the present invention, at least one of these DBs may be provided in an external apparatus outside the robot 100 or 100*a*. The external apparatus may be, for example, a cloud server or a charging station for charging the battery 112 of the robot 100 or 100*a*. In this case, the robot 100 or 100*a* communicates with the external apparatus via the wireless communication unit 116 to register data in each DB and read data from each DB.

In addition, the function of the determination unit 160 or 160*a* may be provided not only to the robot 100 or 100*a* but also to an apparatus outside the robot 100 or 100*a*. For example, an external apparatus including the grip strength DB 193 may have the function of the determination unit 160 or 160*a*. In this case, the external apparatus receives, from the robot 100 or 100*a*, physical information on a predetermined target acquired by the robot 100 or 100*a* and updates the grip strength DB 193 with the received physical information. Then, the external apparatus refers to the grip strength DB 193, determines whether the physical function on the predetermined target has deteriorated, and notifies the robot 100 or 100a of the determination result.

Furthermore, the functions and operations described in the first embodiment may be combined with the functions and operations described in the second embodiment. For example, the robot 100 or 100a may acquire, as the user's physical information, the grip strength as described in the first embodiment, and may further detect, when the grip strength is lower than a predetermined threshold, the user's response to the examination operation as the user's physical information as described in the second embodiment. Then, as described in the second embodiment, the robot 100 or 100a may determine whether the user's physical function has deteriorated based on the user's response to the examination operation, and perform training support operation when the user's physical function is determined to have deteriorated.

In the embodiments, the units shown in FIG. 3 function by, in the control unit 110, the CPU executing a program stored in the ROM. However, in the present invention, the control unit 110 may include, instead of the CPU, dedicated hardware, such as an application specific integrated circuit (ASIC), a field-programmable gate array (FPGA), or various control circuits, and the dedicated hardware may function as the units shown in FIG. 3. In this case, the function of each unit may be implemented by separate hardware, or the functions of the units may be implemented by hardware collectively. In addition, some functions of the units may be implemented by dedicated hardware, and other functions may be implemented by software or firmware. Note that, a main unit, including the dedicated hardware and the CPU, that performs the functions can be collectively called a processor.

The robot having the configuration for implementing the functions according to the present invention can be provided, and furthermore, an existing information processing apparatus or the like can function as the robot according to the present invention by applying the program. That is, by applying program for implementing the functional configuration of the robot 100 exemplified in the above embodiments so that a CPU or the like that controls an existing information processing apparatus or the like can execute the program, the existing information processing apparatus can function as the robot according to the present invention.

Moreover, the program can be applied by any method. The program can be stored in a computer-readable storage medium, such as a flexible disk, a Compact Disc (CD)-ROM, a Digital Versatile Disc (DVD)-ROM, and a memory card, and applied. Furthermore, the program can be applied via a communication medium, such as the Internet, by being superimposed on a carrier wave and. For example, the program may be posted and distributed in a Bulletin Board System (BBS) on a communication network. Then, the program may be activated and executed in the similar manner to other application programs under the control of an OS (Operating System) to execute the above processing.

The preferred embodiments of the present invention have been described above, but the present invention is not limited to the specific embodiments, and includes the invention described in the claims and the equivalent scope thereof.

What is claimed is:
1. A robot comprising:
an actuator configured to cause the robot to operate;
a holding portion configured to be held by a target; and
a processor configured to:
acquire, when the holding portion is held by the target, physical information on a physical function of the target, and
cause, by controlling the actuator depending on the acquired physical information, the robot to perform at least one of an examination operation for examining the physical function of the target and a training support operation for training the physical function of the target.

2. The robot according to claim 1, wherein
the processor is configured to:
determine, based on the acquired physical information, whether the physical function of the target has deteriorated, and
cause, when the physical function is determined to have deteriorated, the robot to perform at least one of the examination operation and the training support operation by controlling the actuator.

3. The robot according to claim 2, wherein
the processor is configured to
cause, when the physical function is determined to have deteriorated and when the physical function of the target has not been examined within a latest predetermined period, the robot to perform the examination operation by controlling the actuator.

4. The robot according to claim 2, wherein
the processor is configured to cause, when the physical function is determined to have deteriorated and when the physical function of the target has been examined within a latest predetermined period, the robot to perform the training support operation by controlling the actuator.

5. The robot according to claim 1, wherein
the processor is configured to acquire, as the physical information, information on a brain function of the target.

6. The robot according to claim 1, wherein
the examination operation is an operation for examining whether the target suffers from dementia, and
the training support operation is an operation for preventing the dementia.

7. The robot according to claim 1 further comprising
a sensor provided at the holding portion and configured to measure a grip strength of the target, wherein
the processor is configured to acquire, as the physical information, the grip strength measured by the sensor.

8. The robot according to claim 7, wherein
the processor causes, when the acquired grip strength is lower than a predetermined threshold, the robot to perform at least one of the examination operation and the training support operation by controlling the actuator.

9. The robot according to claim 1, wherein
the processor is configured to:
cause, when the holding portion is held by the target, the robot to perform the examination operation by controlling the actuator,
acquire the physical information by detecting a response of the target to the examination operation, and
cause, when the physical function of the target is determined to have deteriorated based on the acquired physical information, the robot to perform the training support operation by controlling the actuator.

10. The robot according to claim 9, wherein
the processor is configured to acquire the physical information by detecting, as the response, a voice emitted from the target or a direction in which the holding portion is moved by the target.

11. The robot according to claim 1, wherein
the processor is configured to cause, while the holding portion is being held by the target, the robot to perform at least one of the examination operation and the training support operation by controlling the actuator.

12. The robot according to claim 1, wherein
the processor is configured to:
recognize a face of the target when the holding portion is held by the target, and
change, depending on a change in an expression of the recognized face, the examination operation or the training support operation to be performed by the robot.

13. The robot according to claim 1, wherein
the processor is configured to request, when the holding portion has been held by the target for a time shorter than a predetermined time, the target to hold the holding portion for a longer time by controlling the actuator.

14. The robot according to claim 1, wherein
the actuator is configured to move the robot, and
the processor is configured to move the robot toward the target while stretching the holding portion in the front of the robot by controlling the actuator.

15. The robot according to claim 1, wherein
the processor is configured to change, when the physical function of the target is determined to have deteriorated, the number, type, or difficulty of the training support operation to be performed by the robot depending on a deterioration level of the physical function.

16. The robot according to claim 1, wherein
the holding portion is at least one hand portion provided to the robot.

17. The robot according to claim 1 further comprising:
at least one of a movable unit that is a component driven by the actuator, a display, and a speaker, wherein
the processor is configured to cause the robot to perform at least one of the examination operation and the training support operation by controlling the actuator so as to move the movable unit, to display an image on the display, or to output a voice from the speaker.

18. The robot according to claim 1, wherein
the target includes a human.

19. A robot control method comprising:
acquiring, when a holding portion of the robot is held by a target, physical information on a physical function of the target; and
causing, depending on the acquired physical information, the robot to perform at least one of an examination operation for examining the physical function of the target and a training support operation for training the physical function of the target.

20. A non-transitory storage medium for causing a computer of a robot to function as:
an acquisition unit configured to acquire, when a holding portion of the robot is held by a target, physical information on a physical function of the target; and
a motion control unit configured to cause, depending on the physical information acquired by the acquisition unit, the robot to perform at least one of an examination operation for examining the physical function of the target and a training support operation for training the physical function of the target.

* * * * *